Oct. 31, 1950     F. L. WEED     2,528,097
VALVE MECHANISM FOR STEAM ENGINES
Filed May 17, 1946     2 Sheets-Sheet 1
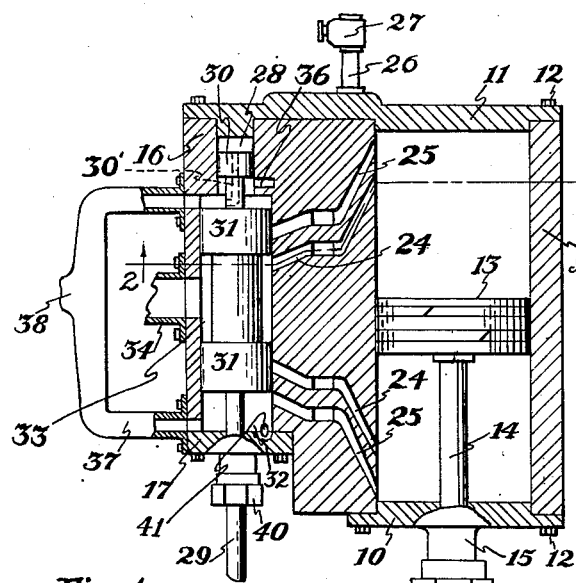
Fig.1
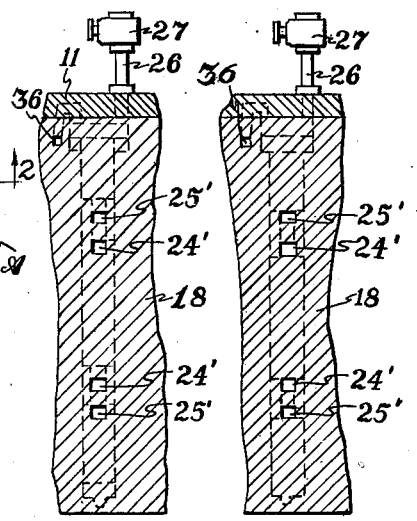
Fig.3    Fig.4
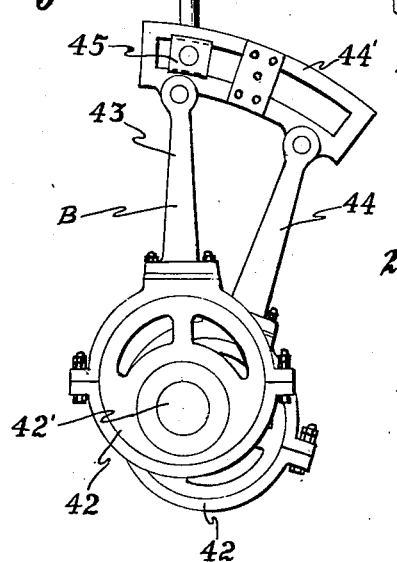
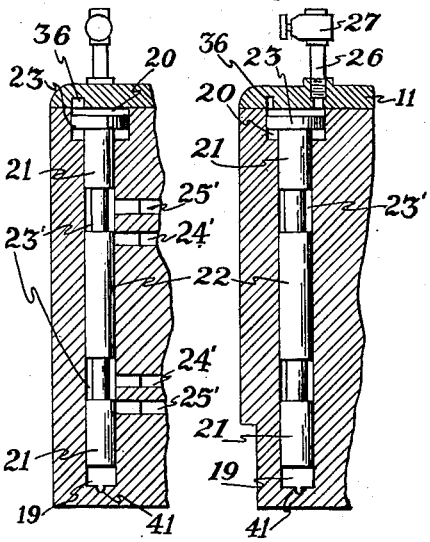
Fig.5    Fig.6    Fig.7
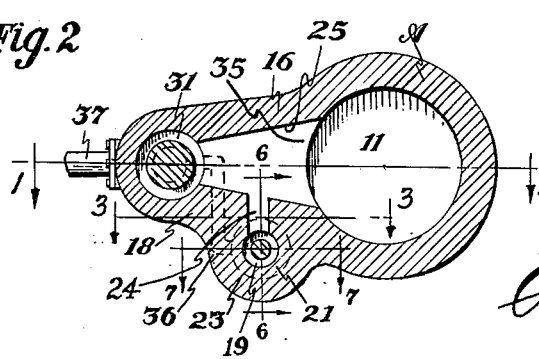
Fig.2
INVENTOR.
Frank L. Weed
BY Ralph Burch
ATTORNEY.

Oct. 31, 1950 F. L. WEED 2,528,097
VALVE MECHANISM FOR STEAM ENGINES
Filed May 17, 1946 2 Sheets-Sheet 2

INVENTOR.
Frank L. Weed
BY
Ralph Burch
Attorney

Patented Oct. 31, 1950

2,528,097

UNITED STATES PATENT OFFICE 2,528,097

VALVE MECHANISM FOR STEAM ENGINES

Frank L. Weed, Neponset, Mass.

Application May 17, 1946, Serial No. 670,345

8 Claims. (Cl. 121—136)

This invention relates to improvements in engines and especially locomotive and stationary steam engines or the like.

The primary object of the invention is the provision of an engine of this character, wherein in addition to the main valve there is associated therewith an automatic pressure regulating valve which upon starting of the engine will reduce the pressure of the compressed steam on the exhaust side of the engine piston and then after the engine has started will change the flow of steam to the engine cylinder so it will enter by one passage and leave by another passage thus increasing the operating efficiency of the engine and insuring economy in the consumption of steam.

A further object of the invention resides in providing an automatic pressure regulating valve actuated by the pressure of steam in the main valve chamber which is controlled by a pilot valve to open and close the regulating valve on the long and short strokes of the main valve, respectively.

A further object of the invention is the provision of an engine of this character, wherein the assembly thereof is novel and unique, it being compact, and renders a smooth working condition in the operation of such engine, at the starting, stopping and operating periods.

A still further object of the invention is the provision of an engine of this character, which is simple in construction, thoroughly reliable and efficient in operation, strong, durable, giving maximum power with minimum steam consumption, and inexpensive to manufacture and install.

Other objects and advantages of the invention will be apparent during the course of the following description.

In the accompanying drawings forming a part of this specification and wherein like numerals are employed to designate like parts throughout the same, Figure 1 is a vertical longitudinal central sectional view through the engine, as indicated approximately on the line 1—1 of Figure 2, looking in the direction of the arrows.

Figure 2 is a sectional view taken on the line 2—2 of Figure 1, looking in the direction of the arrows, Figure 3 is a fragmentary sectional view taken approximately on the line 3—3 of Figure 2 looking in the direction of the arrows, showing the closed position of the regulating valve in dotted lines, Figure 4 is a view similar to Figure 3 showing in dotted lines the open position of the regulating valve.

Figure 5 is a view showing in side elevation the pressure regulating valve,

Figure 6 is a sectional view taken on line 6—6 of Figure 2,

Figure 7 is a sectional view taken on line 7—7 of Figure 2 and

Figure 8:
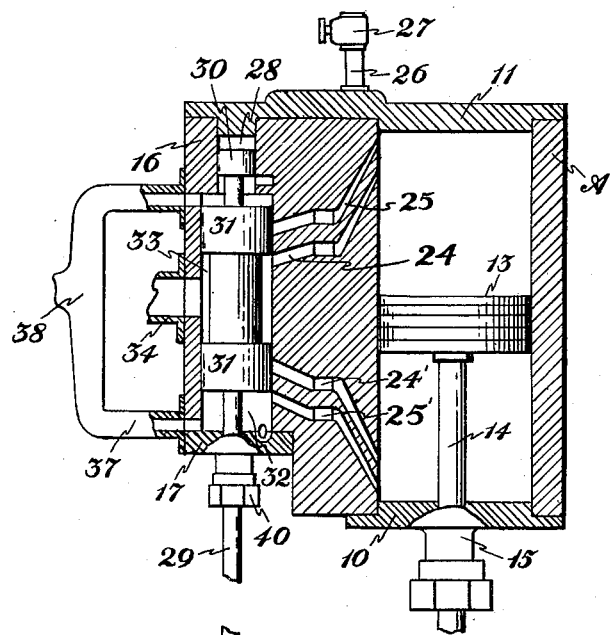
Figure 8 is a view similar to Figure 1 showing a shaft governor for controlling the stroke of the main steam valve.
Figure 8:
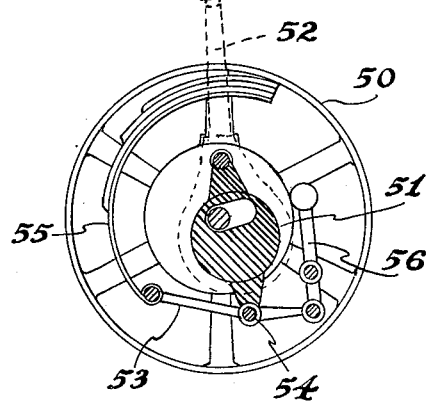

Referring to the drawing wherein for the purpose of illustration preferred embodiment of the invention is shown A designates a steam cylinder having removable heads 10 and 11 secured to the ends of the cylinder by bolts 12. A power piston 13 mounted to reciprocate in the cylinder A has a piston rod 14 connected thereto which extends through the packing gland 15 carried by the head 10.

A valve cylinder 16 is cast integral with the wall of the cylinder A and is disposed in spaced parallel relation thereto. One end of the valve cylinder is covered by an extension of the head 11 of cylinder A while the oposite end is covered by a supplemental head 17. Intermediate the cylinder A and valve cylinder 16 is an off-set portion 18 having formed therein an auxiliary valve chamber 19. The valve chamber 19 extends parallel to the cylinder A and valve cylinder 16 and has one end enlarged, as at 20. Mounted to reciprocate within the valve chamber 19 is a pressure regulating piston valve 21 having uniformly spaced valve pistons 21 and 22 and a piston-like head 23 operating within the enlarged end 20 of the valve chamber. The spacing of the valve pistons 21 and 22 provides flow cavities 23' adapted at times to register with the branch passages 24' and 25' to establish communication between passages 24' and 25'. The passages 24' and 25' intersect the main steam exhaust and inlet passages 24 and 25 establishing communication between the valve cylinder 16 and cylinder A. The passages 24 and 25 are arranged in sets, two adjacent each end of the cylinder A and extend from the valve cylinder 16 in diverging relation.

An outlet pipe 26 extends through the head 11 into communication with the enlarged end 20 of the chamber 19 and has a control valve 27 connected therewith. A pilot valve chamber 28 is formed in one end of the valve cylinder 16 having a pilot valve 30 mounted to reciprocate therein. The pilot valve 30 is connected to one end of the piston valves 31 mounted to reciprocate in valve cylinder 16. The piston valves are actuated by a valve rod 29 which extends through a packing gland 40 attached to the head 17. There are two piston valves 31, one for each set of steam passages 24 and 25 and the space between the pistons 31 provides an exhaust chamber 33 which communicates with an exhaust pipe 34. A steam supply pipe 38 has branch pipes 37 leading to opposite ends of the valve cylinder 16. The pilot valve chamber 28 has communication with the enlarged end 20 of the valve chamber 19 through passage 36 and a passage 30' extending axially through the pilot valve 30 and opening into chamber 16 establishes communication between the pilot valve chamber 28 and main valve chamber 16 to admit steam into the chamber 28 at all times. The opposite end of chamber 19 has communication with the valve chamber 16 through a passage 41 which is open at all times.

A conventional reverse gear B for actuating the valve rod 29 is shown in Figure 1 and consists of two eccentrics 42 mounted on a shaft 42' and having straps 43 and 44 connected to opposite ends of a link 44' in which a block 45 connected to the end of valve rod 29 is mounted for sliding movement. The eccentrics are so placed that when one is in the right position for the engine to move forward, the other is in the right position for moving backward; and by raising or lowering the link 44' motion will be communicated to the valve rod to control the main piston valves to move the engine forward or backward. The link being connected with the eccentrics receives a reciprocating motion, one end of the link being moved in one direction while the opposite end is moved in the other direction.

In operation, when the piston 13 is at the bottom end of cylinder A and the piston valves 31 are moved by the valve gear B in an upward direction, the lower inlet passage 25 is opened allowing steam to enter the lower end of cylinder A while the exhaust passage 24 at the top of the cylinder is opened to allow the exhaust of steam from the upper end of cylinder A. As the piston valves 31—31 move upwardly, pilot valve 30 is moved upwardly and if it moves far enough it will uncover the passage 36 allowing steam to pass into the end 20 of the pressure regulating valve chamber 19 against the head 23 which moves the piston valves 21—22 downwardly uncovering the sets of passages 24' and 25'. The stroke of valves 31—31 depends on the position of block 45 in link 44' which may be adjusted to provide a short or long stroke. In starting block 45 is positioned so valves 31—31 are moved the full length of their stroke which moves pilot valve 30 to uncover passage 36 allowing steam to pass into the chamber 20 and actuate piston head 23 to move the regulating valves 21 and 22 downward uncovering branch passages 24' and 25' to establish communication between the passages. Upon shortening the stroke of valves 31—31 pilot valve 30 does not uncover passage 36 and pressure of steam on the lower end of valves 21—22 will move the valves upward thus closing communication between the branch passages 24' and 25'.

The passages 24' and 25' provide a by-pass from passages 24 and 25 when they are open thus reducing the pressure on the exhaust side of piston 13 only when starting the engine. As shown in Figure 1 the valves 31—31 are at their long upward stroke and passage 36 is uncovered so that the regulating valves 21 and 22 have moved downward. Inlet passage 25 at the bottom and exhaust passage 24 at the top are uncovered permitting steam to flow to the lower side of piston 13 and exhaust from the upper side. When piston 13 moves far enough upward so as to cover upper exhaust passage 24 steam compressed in cylinder A will still continue to flow through passages 25 and by-passes through the branch passages 25' and 24' to the exhaust passage 24 thus completely releasing the pressure from the exhaust side of the piston 13. After the engine is started the stroke of the valve 31—31 is shortened, so that passage 36 is not opened, thus valves 21 and 22 will close branch passages 24' and 25', so the steam flowing to and from the ends of cylinder A will enter the cylinder through passage 25 and leave through passage 24.

In Figure 8 a shaft governor for controlling the stroke of valve rod 29 is shown which includes a governor wheel 50 carrying a pivoted slotted eccentric 51 connected with the valve rod 29 by a connecting rod 52. Adjustment of the eccentric is caused by a link 53 connected thereto, as at 54, one end of the link being attached to a flat spring 55 carried by wheel 50 and the other end is attached to a pivoted weight arm 56 also carried by the wheel 50. As the speed of the wheel changes the weight arm will be swung inwardly and outwardly thus moving the link 53 which shifts the eccentric 51 to control the stroke of valve rod 29.

It is to be understood that the form of my invention herein shown and described is to be taken as a preferred example of the same and that certain changes in the shape, size and arrangement of the parts may be made without departing from the spirit of the invention.

Having thus described my invention, I claim:

1. An engine of the character described comprising a cylinder, a piston mounted to reciprocate in said cylinder, a main valve chamber having a set of inlet and exhaust passages at each end communicating with the ends of said cylinder, reciprocating valves in said main valve chamber for controlling the passage of steam through the inlet and exhaust passages, an auxiliary valve chamber having by-pass passages establishing communication between the inlet and exhaust passages of each set and a reciprocating valve operable in said auxiliary valve chamber over the by-pass passages to regulate the pressure on the exhaust side of said piston.

2. An engine as described in claim 1 including means for admitting steam into the auxiliary valve chamber for operating the reciprocating valve therein.

3. An engine as described in claim 1 including means operable by the movement of the first mentioned reciprocating valve to control the admission of steam into said auxiliary valve chamber for operating the second mentioned reciprocating valve.

4. An engine of the character described comprising a cylinder, a reciprocating piston mounted in said cylinder, a main valve chamber having a set of inlet and exhaust passages at each end communicating with said cylinder, reciprocating valves in said main valve chamber for controlling the passage of steam through the inlet and exhaust passages, an auxiliary valve chamber having by-pass passages establishing communication between the inlet and exhaust passages of each set, a reciprocating piston valve operable in said auxiliary valve chamber to control the by-pass passages to regulate the pressure of steam on the exhaust side of said piston, and branch passages establishing communication between said main valve chamber and each end of said auxiliary valve chamber for admitting steam into the auxiliary valve chamber to operate the piston valve therein.

5. An engine as described in claim 4 including means operable by said main reciprocating valve to control the flow of steam through one of said branch passages.

6. An engine of the character described comprising a cylinder, a piston mounted to reciprocate in said cylinder, a main valve chamber having a set of inlet and exhaust passages at each end communicating with said cylinder, valve means controlling the flow of steam through the inlet and exhaust passages, by-pass passages establishing communication between the inlet and exhaust passages of each set, and valve means controlling the flow of steam through said by-pass passages.

7. An engine as described in claim 6 wherein the last-mentioned valve means is actuated by the pressure of steam in said main valve chamber.

8. An engine of the character described comprising a cylinder, a piston mounted to reciprocate in said cylinder, a main valve chamber having sets of inlet and exhaust passages establishing communication between the ends of said valve chamber and said cylinder, a piston valve mounted to reciprocate in said main valve chamber over the ports of the inlet and exhaust passages, an auxiliary valve chamber having communication at each end with said main valve chamber, by-pass passages leading from said auxiliary valve chamber to the inlet and exhaust passages, a reciprocating piston valve mounted in said auxiliary valve chamber over the ports of said by-pass passages, and means operable by the first mentioned piston valve to control the passages of steam from one end of the main valve chamber to one end of said auxiliary valve chamber to control the operation of the second mentioned piston valve.

FRANK L. WEED.

REFERENCES CITED

The following references are of record in the file of this patent:

UNITED STATES PATENTS

| Number | Name | Date |
| --- | --- | --- |
| 589,355 | Knight | Aug. 31, 1897 |
| 909,665 | Prescott | Jan. 12, 1909 |
| 1,042,846 | Turner | Aug. 29, 1912 |
| 1,106,338 | Stevens | Aug. 4, 1914 |
| 1,145,177 | Baker | July 6, 1915 |